United States Patent
Dong

(10) Patent No.: US 12,103,353 B2
(45) Date of Patent: Oct. 1, 2024

(54) THERMAL MANAGEMENT SYSTEM

(71) Applicant: HANGZHOU SANHUA RESEARCH INSTITUTE CO., LTD., Hangzhou (CN)

(72) Inventor: Junqi Dong, Hangzhou (CN)

(73) Assignee: HANGZHOU SANHUA RESEARCH INSTITUTE CO., LTD., Hangzhou (CN)

( * ) Notice: Subject to any disclaimer, the term of this patent is extended or adjusted under 35 U.S.C. 154(b) by 369 days.

(21) Appl. No.: 17/546,044

(22) Filed: Dec. 8, 2021

(65) Prior Publication Data
US 2022/0097478 A1 Mar. 31, 2022

Related U.S. Application Data

(63) Continuation of application No. PCT/CN2020/123542, filed on Oct. 26, 2020.

(30) Foreign Application Priority Data

Oct. 30, 2019 (CN) .......................... 201911042175.8

(51) Int. Cl.
*B60H 1/32* (2006.01)
*B60H 1/00* (2006.01)
*B60H 1/22* (2006.01)

(52) U.S. Cl.
CPC ....... *B60H 1/00392* (2013.01); *B60H 1/3228* (2019.05); *B60H 1/32284* (2019.05);
(Continued)

(58) Field of Classification Search
CPC ................ B60H 1/323; B60H 1/32284; B60H 1/00392; B60H 1/00278; B60H 2001/00307
See application file for complete search history.

(56) References Cited

U.S. PATENT DOCUMENTS 9,810,465 B2 * 11/2017 Kang ...................... F25B 49/02
10,173,491 B2 * 1/2019 Kim .................... B60H 1/00007
(Continued)

FOREIGN PATENT DOCUMENTS

CN 109228962 A * 1/2019 ............... B60H 1/00
CN 109297208 A 2/2019
(Continued)

*Primary Examiner* — Devon Russell
(74) *Attorney, Agent, or Firm* — Cheng-Ju Chiang

(57) ABSTRACT

A thermal management system includes a refrigerant flow path, a coolant liquid flow path, a first heat exchanger and a second heat exchanger. The refrigerant flow path includes a compressor, a first indoor heat exchanger, a first flow regulation device, and a second flow regulation device. The coolant liquid flow path includes a first heat exchange assembly and a heater. The first heat exchanger includes a first heat exchange portion and a second heat exchange portion. The second heat exchanger includes a third heat exchange portion and a fourth heat exchange portion. The thermal management system has a first heating mode and a second heating mode. The thermal management system
(Continued)

provides thermal energy required for heating by at least one of the following selectable processes: heating of the heater, and generating excess heat during operation of the first heat exchange assembly.

20 Claims, 12 Drawing Sheets

(52) U.S. Cl.
CPC ......... *B60H 1/323* (2013.01); *B60H 1/00278* (2013.01); *B60H 2001/00307* (2013.01); *B60H 1/2215* (2013.01); *B60H 1/3227* (2013.01)

(56) References Cited

U.S. PATENT DOCUMENTS

| | | | |
|---|---|---|---|
| 2012/0297805 A1 | 11/2012 | Kamada | |
| 2015/0217627 A1* | 8/2015 | Kang | B60H 1/00921 62/324.6 |
| 2016/0107505 A1 | 4/2016 | Johnston | |
| 2017/0361677 A1* | 12/2017 | Kim | H01M 10/663 |
| 2019/0135075 A1* | 5/2019 | Hwang | B60H 1/00278 |
| 2019/0263223 A1* | 8/2019 | Durrani | B60H 1/00921 |
| 2020/0070628 A1* | 3/2020 | Tan | B60H 1/00 |

FOREIGN PATENT DOCUMENTS

| | | | | |
|---|---|---|---|---|
| CN | 109968940 A | * | 7/2019 | |
| CN | 110027386 A | | 7/2019 | |
| CN | 110039973 A | | 7/2019 | |
| CN | 110053445 A | | 7/2019 | |
| CN | 110108055 A | | 8/2019 | |
| CN | 110154683 A | | 8/2019 | |
| CN | 110182017 A | | 8/2019 | |
| CN | 209240827 U | | 8/2019 | |
| CN | 110385965 A | | 10/2019 | |
| EP | 3982054 A1 | | 4/2022 | |
| KR | 10-2007-0025278 A | | 3/2007 | |
| KR | 10-2017-0008603 A | | 1/2017 | |
| KR | 10-2019-0020353 A | | 3/2019 | |
| WO | WO-2018161907 A1 | * | 9/2018 | ............... B60H 1/00 |
| WO | WO-2019001330 A1 | * | 1/2019 | ............... B60H 1/00 |
| WO | 2021/083067 A1 | | 5/2021 | |
| WO | 2021/239137 A1 | | 12/2021 | |

* cited by examiner

THERMAL MANAGEMENT SYSTEM

CROSS-REFERENCE TO RELATED APPLICATION

This application is a bypass continuation of National Phase conversion of International (PCT) Patent Application No. PCT/CN2020/123542, filed on Oct. 26, 2020, which further claims priority of a Chinese Patent Application No. 201911042175.8, filed on Oct. 30, 2019 and titled "THERMAL MANAGEMENT SYSTEM", the entire content of which is incorporated herein by reference in the present disclosure.

TECHNICAL FIELD

The present disclosure relates to a field of thermal management technology, and in particular to a thermal management system.

BACKGROUND

A related thermal management system includes a coolant flow path and a refrigerant flow path. The coolant flow path includes a heater, a battery or other components. When the ambient temperature is low in winter, the system executes a heating mode. The refrigerant flow path can absorb heat of the coolant flow path through a corresponding heat exchanger. The heat of the coolant comes from the excess heat generated by the battery or other components during operation. The heater can be turned off at this time. The thermal management system can not only improve its heating capacity but also maintain the normal operating temperature of the battery or other components by recovering the waste heat. If the heater is turned on at the same time, more heat can be provided to the refrigerant flow path to further enhance the heating capacity of the system. However, components such as the battery cannot provide excess heat when the operating temperature is low. The heater is turned on at this time. Part of the heat needs to be used for preheating the battery or other components, and cannot be quickly heated. Therefore, the thermal management system also needs to be optimized to meet different heating requirements.

SUMMARY

In view of the above-mentioned problem, the present disclosure provides a thermal management system. In a heating mode, the system can select at least one group of heat from the heater heating and the excess heat generated during the operation of the first heat exchange component so as to provide the heat required for heating.

In order to achieve the above object, a first aspect of the present disclosure provides a thermal management system, including a refrigerant flow path, a coolant flow path, a first heat exchanger and a second heat exchanger; the refrigerant flow path including a compressor, a first indoor heat exchanger, the first flow regulating device and a second flow regulating device; the coolant flow path including a first heat exchange component and a heater;

wherein the first heat exchanger includes a first heat exchange portion and a second heat exchange portion, the first heat exchange portion is connected to the coolant flow path, the second heat exchange portion is connected to the refrigerant flow path; the second heat exchanger includes a third heat exchange portion and a fourth heat exchange portion, the third heat exchange portion is connected to the coolant flow path, and the fourth heat exchange portion is connected to the refrigerant flow path;

wherein the thermal management system includes a first heating mode and a second heating mode;

in the first heating mode, the compressor, the first indoor heat exchanger, the second flow regulating device and the fourth heat exchange portion are in communication; and, the first heat exchange component, the heater and the third heat exchange portion are in communication; wherein, when the heater is turned on, the heater heats a coolant, and the coolant absorbs heat from the first heat exchange component; or the heater is turned off, and the coolant absorbs heat of the first heat exchange component; the second flow regulating device throttles the refrigerant flow path, and a refrigerant in the fourth heat exchange portion absorbs heat of the coolant in the third heat exchange portion;

in the second heating mode, the compressor, the first indoor heat exchanger, the first flow regulating device and the second heat exchange portion are in communication; and, the first heat exchange portion and the heater are in communication; wherein the heater is turned on to heat the coolant, the first flow regulating device throttles the refrigerant flow path, and the refrigerant in the second heat exchange portion absorbs heat of the coolant in the first heat exchange portion.

A second aspect of the present disclosure provides a thermal management system, including a compressor, a first indoor heat exchanger, an outdoor heat exchanger, a first flow regulating device, a second flow regulating device, a first heat exchange component, a heater, a first heat exchanger, a second heat exchanger and a driving device;

wherein the first heat exchanger and the second heat exchanger are both dual-channel heat exchangers, the first heat exchanger includes a first heat exchange portion and a second heat exchange portion, and the second heat exchanger includes a third heat exchange portion and a fourth heat exchange portion;

wherein the thermal management system includes a first heating mode and a second heating mode;

in the first heating mode, the compressor, the first indoor heat exchanger, the second flow regulating device and the fourth heat exchange portion are in communication; the driving device, the first heat exchange component, the heater and the third heat exchange portion are in communication; the second flow regulating device throttles a refrigerant, and the refrigerant in the fourth heat exchange portion absorbs heat of a coolant in the third heat exchange portion; and in the second heating mode, the compressor, the first indoor heat exchanger, the first flow regulating device, the second heat exchange portion and the outdoor heat exchanger are in communication; the driving device, the first heat exchange portion and the heater are in communication; the heater is turned on to heat the coolant, the first flow regulating device throttles the refrigerant, and the refrigerant in the second heat exchange portion absorbs heat of the coolant in the first heat exchange portion.

It can be seen from the above technical solutions that the thermal management system of the present disclosure includes the first heating mode and the second heating mode. In the first heating mode, for example, if the first heat exchange component generates excess heat, the heat provided by the coolant flow path to the refrigerant flow path may be the excess heat generated during the operation of the first heat exchange component. At the same time, the working temperature of the first heat exchange component can be maintained in a normal interval. It is also possible to turn on the heater at the same time, so that the refrigerant absorbs the two sets of heat generated by the heater and the first heat exchange component, thereby further enhancing the heating capacity of the system. In the second heating mode, for example, if the first heat exchange component has no excess heat to provide or its operating temperature is lower than the normal value, the heat provided by the coolant flow path to the refrigerant flow path can be generated after the heater is turned on, so that the system can quickly heat up. The thermal management system of the present disclosure can select at least one of the heater heating and the excess heat generated during the operation of the first heat exchange component to provide the required heat during heating so as to meet different heating requirements.

DETAILED DESCRIPTION

Figure 1:
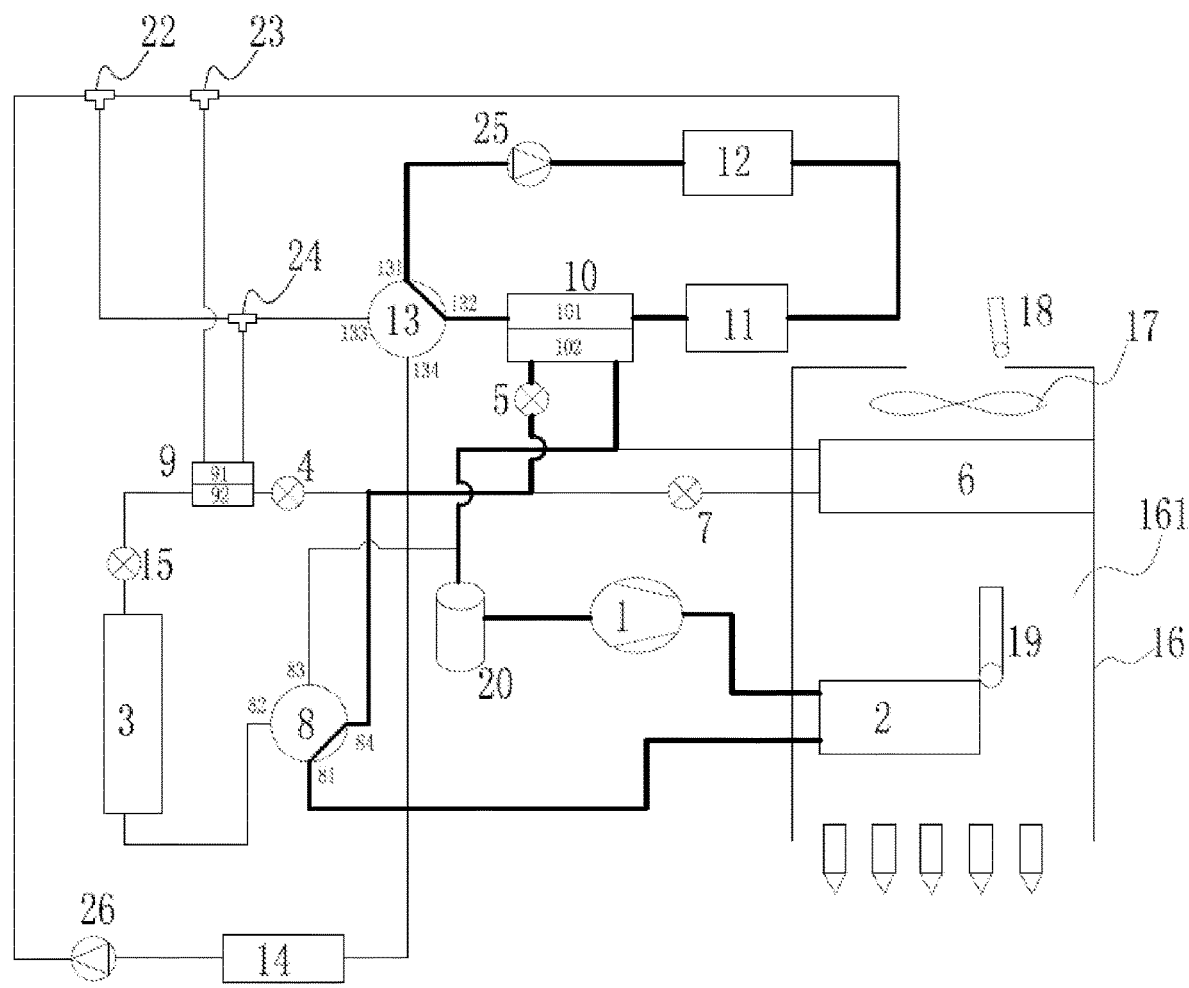
FIG. 1 is a schematic view of a working principle of a first embodiment in a first heating mode of the present disclosure.

The exemplary embodiments will be described in detail here, and examples thereof are shown in the drawings. When the following description refers to the drawings, unless otherwise indicated, the same numbers in different drawings indicate the same or similar elements. The implementation embodiments described in the following exemplary embodiments do not represent all implementation embodiments consistent with the present disclosure. On the contrary, they are merely examples of devices and methods consistent with some aspects of the present disclosure as detailed in the appended claims.

The terms used in the present disclosure are only for the purpose of describing specific embodiments, and are not intended to limit the present disclosure. The singular forms of "a", "said" and "the" described in the present disclosure and appended claims are also intended to include plural forms, unless the context clearly indicates otherwise.

It should be understood that "first", "second" and similar words used in the specification and claims of the present disclosure do not indicate any order, quantity or importance, but are only used to distinguish different components. Similarly, similar words such as "a" or "an" do not mean a quantity limit, but mean that there is at least one. Unless otherwise indicated, similar words such as "front", "rear", "lower" and/or "upper" are only for convenience of description, and are not limited to one position or one spatial orientation. Terms such as "including" or "comprising" and other similar words mean that the elements or components before "including" or "comprising" now cover the elements or components listed after "including" or "comprising" and their equivalents, and do not exclude other elements or components.

In the following, a specific vehicle thermal management system is taken as an example for description in conjunction with the accompanying drawings. In the case of no conflict, the following embodiments and features in the embodiments can be mutually supplemented or combined with each other.

As shown in FIGS. 1 to 12, the present disclosure provides a thermal management system suitable for vehicle air conditioning, such as a thermal management system for a pure electric vehicle. The thermal management system has multiple working modes such as a cooling mode, a heating mode, a dehumidification mode, and a defrosting mode. Specifically, the air-conditioning system includes an air-conditioning case 16 for adjusting the temperature and/or humidity in the passenger cabin. The air-conditioning case 16 roughly includes an air duct 161, an air inlet and an air outlet. In other embodiments, the air inlet of the air-conditioning case 16 may also include a fresh air inlet and an old air inlet which are separated from each other. Among them, the air outlet can also be provided with a grille for the distribution of air flow, so that the air can be blown to different parts of the passenger cabin. The fresh air inlet and the old air inlet can be used to switch between an outer circulation mode and an inner circulation mode of the vehicle air conditioner. A first indoor heat exchanger 2, a second indoor heat exchanger 6 and a blower 17 are disposed in the air duct 161. An air inlet valve 18 is provided at the air inlet. After the blower 17 is turned on, the blower 17, the second indoor heat exchanger 6 and the first indoor heat exchanger 2 are sequentially disposed in the air duct 161 of the air-conditioning case 16 along the air flow direction. And, a windshield valve 19 is provided upstream of the first indoor heat exchanger 2. If the air does not need to exchange heat with the first indoor heat exchanger 2, the windshield valve 19 can be switched to block the air from flowing to the first indoor heat exchanger 2.

The thermal management system of this embodiment specifically includes a refrigerant flow path, a coolant flow path, a first heat exchanger 9 and a second heat exchanger 10. The refrigerant flow path includes a compressor 1, a first indoor heat exchanger 2, an outdoor heat exchanger 3, a first flow regulating device 4, a second flow regulating device 5, a second indoor heat exchanger 6, a third flow regulating device 7, a second fluid switching device 8, a fourth flow regulating device 15, a gas-liquid separator 20, a first control valve 22, a second control valve 23, and a third control valve 24. The first flow regulating device 4, the second flow regulating device 5, the third flow regulating device 7 and the fourth flow regulating device 15 may be electronic expansion valves, which play the role of throttling or communicating the refrigerant flow path. In other embodiments, the above-mentioned flow regulating device may also be a combined device of multiple throttle valves and multiple control valves. The first control valve 22, the second control valve 23 and the third control valve 24 may be three-way valves or three-way proportional regulating valves, which are used to connect pipelines and distribute the coolant flow in each flow path. The coolant flow path includes a first heat exchange component 11, a heater 12, a first fluid switching device 13 and a second heat exchange component 14. The first heat exchange component 11 and the second heat exchange component 14 are used as vehicle heating devices, which can generate excess heat after a long time of operation. For example, the first heat exchange component 11 includes a battery. The second heat exchange component 14 includes a motor, or a combination of any at least two heat-generating components such as a motor, an inverter and a controller etc. The heat transfer between the first heat exchange component 11 and the coolant, and the heat transfer between the second heat exchange component 14 and the coolant can be performed by means of heat radiation, heat exchange, or the like.

The above-mentioned components can be connected by pipelines to form a flow path. Various valves can be set on the pipelines to control the on-off of the pipelines. The coolant flow path is also connected with a driving device for driving the flow of the coolant, and a coolant storage device. The driving device may be an electronic water pump. In this embodiment, the driving device includes a first pump 25 and a second pump 26. The first pump 25 can communicate with the first heat exchange component 11. The second pump 26 can communicate with the second heat exchange component 14. The first pump 25 and the second pump 26 may both be water pumps. The coolant storage device may be a water tank. The coolant can be a mixture of water and ethanol. The gas-liquid separator 20 plays a role in protecting the compressor 1 and is used to separate the gas-liquid two-phase refrigerant so that the refrigerant entering the compressor 1 is in a saturated gas state. In other embodiments, the gas-liquid separator 20 may not be provided. For example, the state of the refrigerant when it flows out of the heat exchanger is in a gaseous state, or the compressor 1 itself has a function of gas-liquid separation. The refrigerant may be carbon dioxide or other refrigerant medium.

The first heat exchanger 9 and the second heat exchanger 10 are both dual-channel heat exchangers. Two flow channels of the dual-channel heat exchanger are blocked from each other and not communicated. For example, the dual-channel heat exchanger can be a shell-and-tube heat exchanger or a plate heat exchanger. The first heat exchanger 9 specifically includes a first heat exchange portion 91 and a second heat exchange portion 92 capable of exchanging heat with the first heat exchange portion 91. The first heat exchange portion 91 is communicated with the coolant flow path. The second heat exchange portion 92 is communicated with the refrigerant flow path. The second heat exchanger 10 specifically includes a third heat exchange portion 101 and a fourth heat exchange portion 102 capable of exchanging heat with the third heat exchange portion 101. The third heat exchange portion 101 is communicated with the coolant flow path. The fourth heat exchange portion 102 is communicated with the refrigerant flow path.

The second fluid switching device 8 is a four-way valve, which specifically includes a fifth port 81, a sixth port 82, a seventh port 83 and an eighth port 84. An outlet of the first indoor heat exchanger 2 is in communication with the fifth port 81 through a pipeline. An inlet of the compressor 1 is in communication with the seventh port 83 through a pipeline. In this embodiment, an inlet of the gas-liquid separator 20 is in communication with the seventh port 83, an outlet of the second indoor heat exchanger 6 and an outlet of the fourth heat exchange portion 102. The gas-liquid separator 20 can also be provided with multiple inlets.

A second port of the outdoor heat exchanger 3 is in communication with the sixth port 82 through a pipeline, a first port of the outdoor heat exchanger 3 is in communication with a second port of the second heat exchange portion 92 through a pipeline, and a first port of the second heat exchange portion 92 is in communication with the eighth port 84 through a pipeline. Or, the second port of the second heat exchange portion 92 is in communication with the sixth port 82 through a pipeline, the first port of the second heat exchange portion 92 is in communication with the second port of the outdoor heat exchanger 3 through a pipeline, and the first port of the outdoor heat exchanger 3 is in communication with the eighth port 84 through a pipeline. This embodiment specifically describes the previous pipeline connection method.

The first fluid switching device 13 includes a first port 131, a second port 132, a third port 133 and a fourth port 134. The first port 131 is in communication with the heater 12 through a pipeline. The second port 132 is in communication with the first heat exchange component 11 through a pipeline. The third port 133 is in communication with the first heat exchange portion 91 through a pipeline. The fourth port 134 is in communication with the second heat exchange component 14 through a pipeline. In this embodiment, both the first fluid switching device 13 and the second fluid switching device 8 are four-way valves. The second fluid switching device 8 is a four-way refrigerant valve. The first fluid switching device 13 is a four-way water valve.

The thermal management system specifically includes a first heating mode, a second heating mode, a battery pre-heating mode, a cooling mode, a first dehumidification mode, a second dehumidification mode, a first defrosting mode, a second defrosting mode, and a battery fast charging and cooling mode. Each mode is described in detail below. Based on this embodiment, each mode can have other pipeline connection methods.

When the ambient temperature is low in winter, the thermal management system of the present disclosure can meet different heating requirements in various situations.

As shown in FIG. 1, in the first embodiment in the first heating mode, the excess heat generated by the first heat exchange component 11 is used as a heat source, and the second heat exchanger 10 is used as an evaporator. For example, the first heating mode is applied when the outdoor heat exchanger 3 is frosted and cannot be used. Of course, it can also be applied to other situations. The fifth port 81 is in communication with the eighth port 84. The first flow regulating device 4 and the third flow regulating device 7 are closed and non-communicating. The first port 131 is in communication with the second port 132. The compressor 1, the first indoor heat exchanger 2, the second fluid switching device 8, the second flow regulating device 5, the fourth heat exchange portion 102 and the gas-liquid separator 20 are in communication to form a loop. At the same time, the first pump 26, the heater 12, the first heat exchange component 11, the third heat exchange portion 101 and the first fluid switching device 13 are in communication to form a loop. Among which, the heater 12 can be turned on or off according to heating requirements. The second flow control device 5 throttles the refrigerant flow path. The first pump 25 is turned on to drive the coolant to flow. The coolant flows to the heater 12 after being driven by the first pump 25, and then returns to the first pump 25 through the first heat exchange component 11, the third heat exchange portion 101 and the first fluid switching device 13 in turn, and circulates in this way.

The working principle of the first heating mode is as follows: when the vehicle is in a low temperature environment in winter and the passenger cabin needs to be heated, the thermal management system can switch to the first heating mode. In the first heating mode, the refrigerant is compressed by the compressor 1 into a high-temperature and high-pressure gas state, and then enters the first indoor heat exchanger 2. At this time, the windshield valve 19 is opened. The air exchanges heat with the first indoor heat exchanger 2, and the air enters the passenger cabin through the air outlet after being heated, which increases the ambient temperature of the passenger cabin. The refrigerant decreases in temperature after passing through the first indoor heat exchanger 2. The low-temperature refrigerant flows to the second flow regulating device 5 through the second fluid switching device 8. The second flow regulating device 5 throttles the refrigerant flow path. The refrigerant flows into the fourth heat exchange portion 102 after decreasing in temperature and depressurizing. At this time, the fourth heat exchange portion 102 is on the low temperature side, and the third heat exchange portion 101 is on the high temperature side. The low-temperature and low-pressure refrigerant in the fourth heat exchange portion 102 absorbs the heat of the coolant in the third heat exchange portion 101 and becomes a liquid state or a gas-liquid two-phase state. Then, the refrigerant is separated from the gas and liquid by the gas-liquid separator 20, then returned to the compressor 1 to be compressed again, and circulates in this way. In other embodiments, when the thermal management system only has the first heating mode, other components such as the first fluid switching device 13 and the second fluid switching device 8 may not be required.

In a first embodiment of the first heating mode, if the heating effect meets the requirements, the heater 12 may not be turned on; if the heating effect does not meet the requirements, the heater 12 can be turned on at the same time, and the coolant flow path can provide more heat to the refrigerant flow path so as to improve the heating effect of the system.

Figure 2:
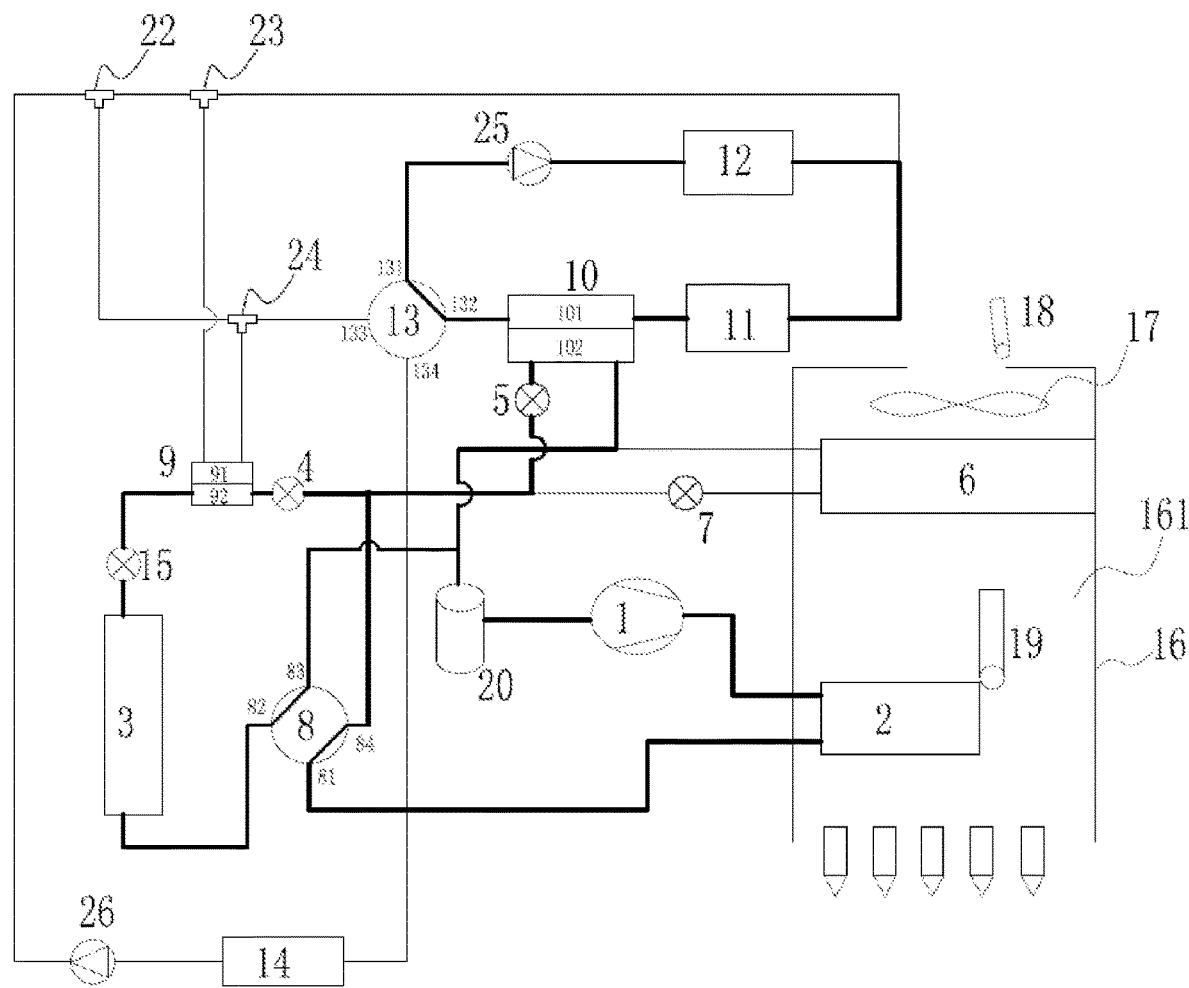
FIG. 2 is a schematic view of the working principle of a second embodiment in the first heating mode of the present disclosure.

FIG. 2 discloses a second embodiment of the first heating mode. When the outdoor heat exchanger 3 can be used normally without being frosted, and the excess heat generated by the first heat exchange component 11 alone cannot meet the requirements, the fifth port 81 is in communication with the eighth port 84, the sixth port 82 is in communication with the seventh port 83, the refrigerant flows through the second fluid switching device 8 and then divided into two paths. One path of the refrigerant flows to the second flow regulating device 5. The working principle of the refrigerant in this path is the same as that of the above-mentioned first embodiment, and will not be described in detail. The other path of the refrigerant flows to the first flow regulating device 4. At this time, the first flow regulating device 4 is in a full-open state, and the first heat exchanger 9 does not participate in heat exchange. The fourth flow regulating device 15 throttles the refrigerant flow path. The refrigerant becomes liquid or gas-liquid two-phase state after passing through the fourth flow regulating device 15, and then enters the outdoor heat exchanger 3. The outdoor heat exchanger 3 exchanges heat with the outdoor environment, and the refrigerant absorbs heat. Then, the second fluid switching device 8 flows to the gas-liquid separator 20 for gas-liquid separation. Finally, the refrigerant returns to the compressor 1 to be compressed again, and circulates in this way. Of course, the heater 12 can also be turned on at the same time, which can further enhance the heating effect. In some embodiments, a branch connected in parallel with the first heat exchanger 9 can also be provided, so that the refrigerant flows directly to the fourth flow regulating device 15 without passing through the first heat exchanger 9, thereby reducing the flow resistance of the refrigerant.

Figure 3:
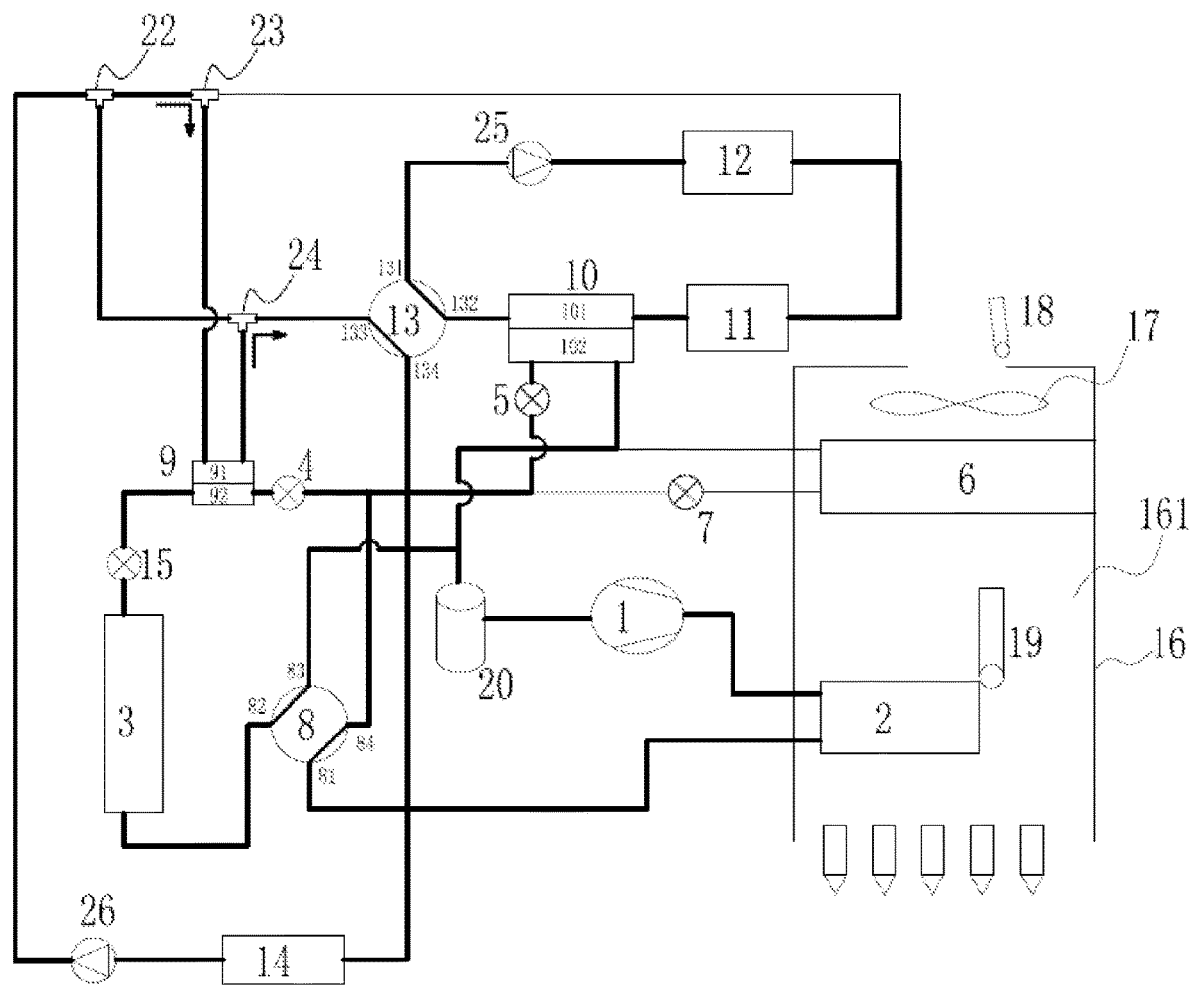
FIG. 3 is a schematic view of the working principle of a third embodiment in the first heating mode of the present disclosure.

FIG. 3 discloses a third embodiment of the first heating mode. Based on the previous two embodiments, the second heat exchange component 14 is added to the coolant flow path. The third port 133 is in communication with the fourth port 134. The second heat exchange component 14, the second pump 26, the first heat exchange portion 91 and the first fluid switching device 13 are in communication to form a loop. The second pump 26 drives the coolant to flow. The coolant is driven by the second pump 26 and then flows to the first control valve 22, the second control valve 23, the first fluid switching device 13 and the second heat exchange component 14 in sequence, and finally returns to the second pump 26, and circulates in this way. The excess heat generated by the second heat exchange component 14 is transferred to the refrigerant flow path through the first heat exchanger 9. When the first control valve 22 is a three-way proportional control valve, the flow rate of the coolant can be adjusted so that part of the coolant flows to the second control valve 23. Then, the second control valve 23 is adjusted so that the coolant flows to the first heat exchange portion 91 of the first heat exchanger 9. The remaining coolant flows directly to the first fluid switching device 13. The coolant after heat exchange with the first heat exchange portion 91 merges with another cold zone liquid to flow to the first fluid switching device 13. Finally, it flows back to the second heat exchange component 14 so that the working temperature of the second heat exchange component 14 is maintained in an appropriate interval. At this time, the first flow control device 4 and the fourth flow control device 15 throttle the refrigerant flow path. After passing through the first flow regulating device 4, the refrigerant becomes liquid or gas-liquid two-phase state, enters the second heat exchange portion 92, exchanges heat with the coolant in the first heat exchange portion 91, and absorbs the heat of the coolant. Then the liquid or gas-liquid two-phase refrigerant flows into the outdoor heat exchanger 3 after passing through the fourth flow regulating device 15. The first heat exchanger 9 and the outdoor heat exchanger 3 are used as evaporators. The outdoor heat exchanger 3 stores liquid or gas-liquid two-phase refrigerant. When the external environment temperature is low and the heat exchange performance of the outdoor heat exchanger 3 is weak, the outdoor heat exchanger 3 will store more refrigerant. The first flow regulating device 4 and the fourth flow regulating device 15 keep the two evaporators at different evaporating temperatures, so that the normal operation of the system can be maintained without increasing the refrigerant charge, and the maximum heat exchange capacity of the outdoor heat exchanger 3 can be fully utilized to improve the heating capacity of the system. In other embodiments, the refrigerant may also pass through the outdoor heat exchanger 3 firstly, and then pass through the first heat exchanger 9. That is, the refrigerant firstly enters the outdoor heat exchanger 3 through the fourth flow regulating device 15, and then flows into the second heat exchange portion 92 through the first flow regulating device 4.

The above three embodiments can be combined with each other. For example, when the outdoor heat exchanger 3 is frosted, the first heat exchanger 9 can also be used instead of the outdoor heat exchanger 3 as an evaporator. At this time, the fourth flow regulating device 15 is in a full-open state, and the heat source comes from the excess heat generated by the second heat exchange component 14. In the first heating mode, the excess heat generated by at least one of the first heat exchange component 11 and the second heat exchange component 14 can be provided to the refrigerant flow path according to actual conditions. The working temperature of the first heat exchange component 11 and/or the second heat exchange component 14 can be maintained in a proper working range, and at the same time, the heating capacity of the system is improved. This is conducive to saving the power consumption of electric vehicles, thereby increasing the range of battery life.

When the vehicle is just started, the heating devices of the vehicle such as the first heat exchange component 11 and the second heat exchange component 14 do not generate excess heat. At this time, if the first heating mode is adopted, the heating effect of the system is poor, and the devices cannot be warmed up well or the working temperature cannot be maintained in a proper range. For example, when the first heat exchange component 11 includes a battery, the battery needs to be warmed up in a low-temperature environment to maintain a better working state. Even if the heater 12 is turned on, after the coolant is heated up, part of its heat needs to be provided to the first heat exchange component 11 for preheating, and the other part is provided to the refrigerant flow path, so that the passenger cabin cannot be heated quickly. If all the heat of the coolant is transferred to the refrigerant flow path, it is not beneficial to the normal operation of the battery, and the temperature control or heat distribution is more complicated.

Figure 4:
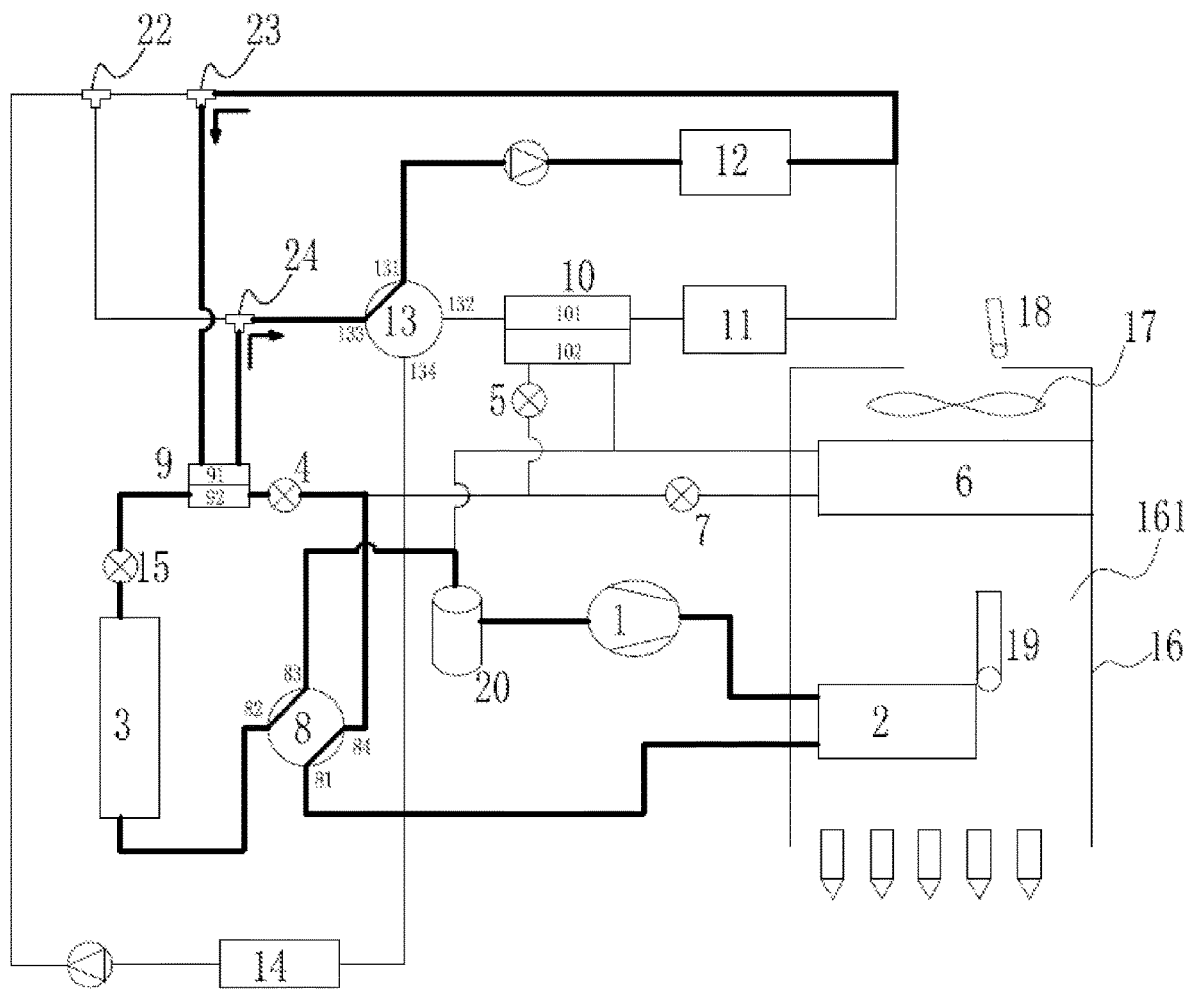
FIG. 4 is a schematic view of a working principle in a second heating mode of the present disclosure.

At this time, the thermal management system can be switched to a second heating mode. As shown in FIG. 4, in the second heating mode, the first port 131 is in communication with the third port 133, the fifth port 81 is in communication with the eighth port 84, the sixth port 82 is in communication with the seventh port 83, and the compressor 1, the first indoor heat exchanger 2, the second fluid switching device 8, the first flow regulating device 4, the second heat exchange portion 92, the fourth flow regulating device 15, the outdoor heat exchanger 3 and the gas-liquid separator 20 are in communication to form a loop. The pipeline connecting the heater 12 and the first heat exchange component 11 is provided with a first branch. By switching the second control valve 23, the first branch can communicate with the first heat exchange portion 91. When the first port 131 and the third port 133 are communicated, the first port 131 and the second port 132 are not communicated. Therefore, the coolant passing through the heater 12 flows to the first heat exchange portion 91. The heater 12, the first branch, the first heat exchange portion 91 and the first fluid switching device 13 are communicated to form a loop. In this way, there is no need to add an additional heat exchanger. The first heat exchanger 9 performs heat exchange between the coolant and the refrigerant. Among them, the heater 12 is turned on to heat the coolant. The first flow control device 4 and the fourth flow control device 15 throttle the refrigerant flow path. The second flow regulating device 5 and the third flow regulating device 7 are closed. The working principle of the refrigerant flow path is the same as the working principle of the third embodiment of the first heating mode, and will not be described in detail here. Among them, the heater may be an electric heater, such as a PTC heater. In the second heating mode, using both the hot water and air source produced by the PTC heater as the heat source makes the system heating more efficient than directly using air or PTC heater to heat the passenger cabin. This is beneficial to save the power consumption of electric vehicles, thereby increasing the range of battery life. This mode is suitable for the stable operation of the air-conditioning system by using the PTC heater to generate hot water when the motor and battery have no heat to use. And, the temperature control of the coolant flow path is more convenient, which only needs to control the PTC heater separately. In other embodiments, when the outdoor heat exchanger 3 is frosted, the fourth flow regulating device 15 is in a full-open state, the refrigerant does not exchange heat when passing through the outdoor heat exchanger 3.

Figure 5:
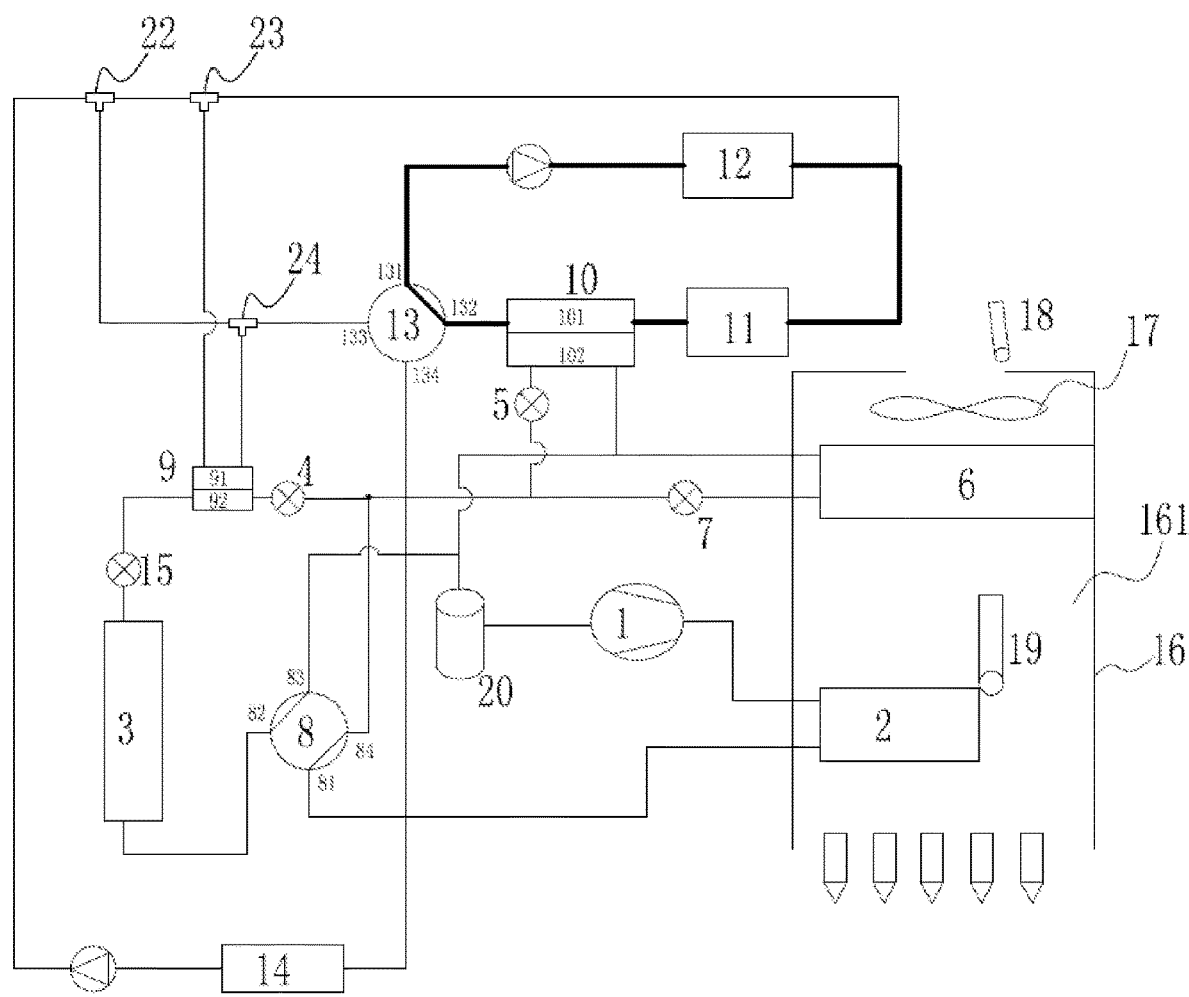
FIG. 5 is a schematic view of a working principle in a battery preheating working mode of the present disclosure.

As shown in FIG. 5, the thermal management system of the present disclosure also includes a battery preheating working mode. In the battery preheating working mode, the first port 131 is in communication with the second port 132. The first heat exchange component 11, the heater 12 and the first fluid switching device 13 are in communication to form a loop. The first heat exchange component 11 may be a battery heat exchange device, which can bring heat to the battery through a coolant, thereby preheating and keeping the battery warm. The heater 12 is turned on to heat the coolant. The refrigerant flow path may not be in an operating state. In the battery preheating working mode, the first heat exchange component 11 can be preheated to make it have a suitable working temperature in a low temperature environment.

Figure 6:
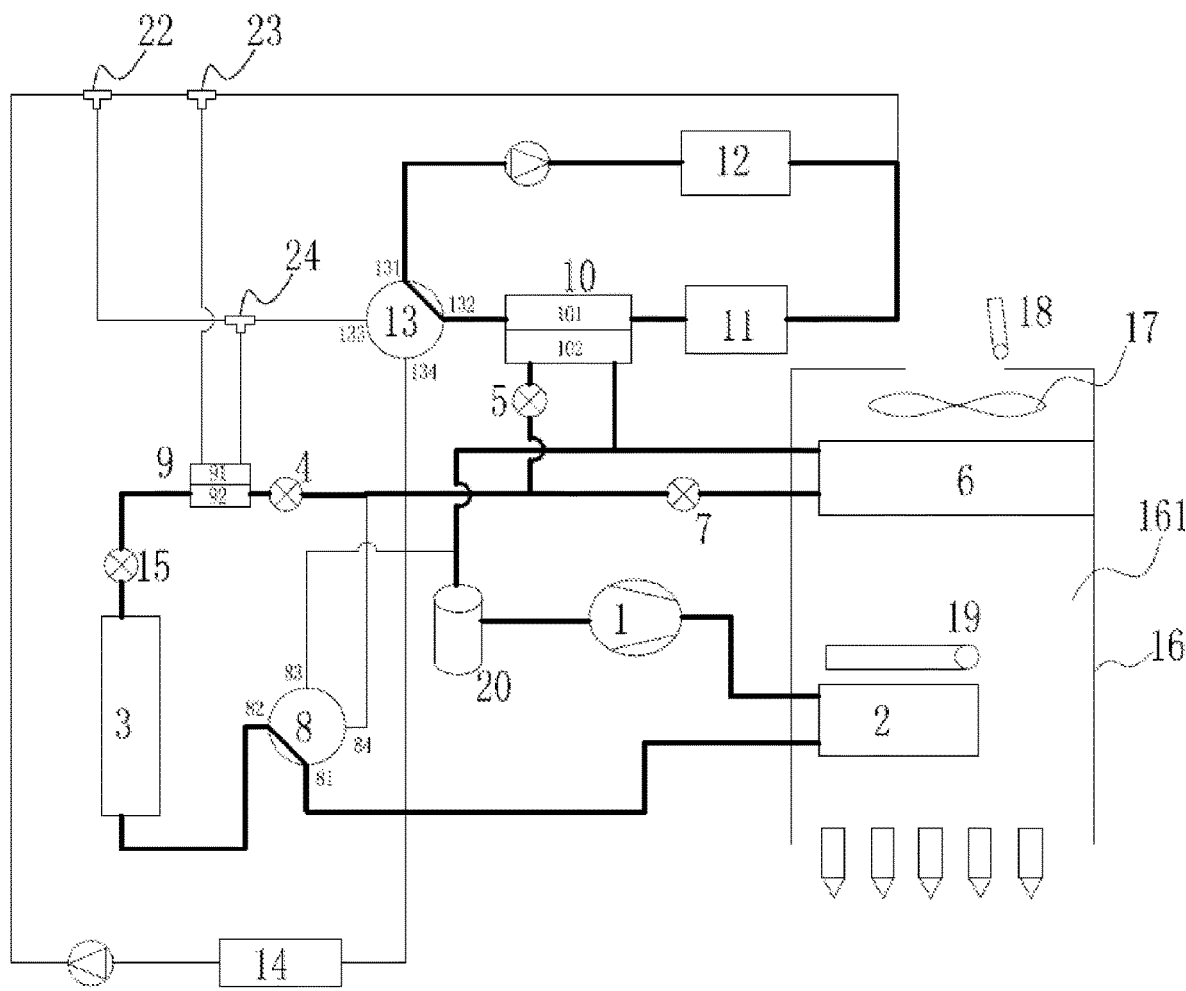
FIG. 6 is a schematic view of a working principle in a cooling mode of the present disclosure.

When the ambient temperature is high in summer, the passenger cabin environment needs to be cooled, and the system can be switched to the cooling mode. As shown in FIG. 6, in the cooling mode, the compressor 1, the first indoor heat exchanger 2, the outdoor heat exchanger 3, the fourth flow regulating device 15, the second heat exchange portion 92, the first flow regulating device 4, the third flow regulating device 7, the second indoor heat exchanger 6 and the gas-liquid separator 20 are in communication to form a loop. At the same time, the compressor 1, the first indoor heat exchanger 2, the outdoor heat exchanger 3, the fourth flow regulating device 15, the first flow regulating device 4, the second heat exchange portion 92, the second flow regulating device 5 and the fourth heat exchange portion 102 are in communication to form a loop. And, the first port 131 is in communication with the second port 132. The heater 12, the first heat exchange component 11, the third heat exchange portion 101 and the first fluid switching device 13 are in communication to form a loop. Among which, the second flow regulating device 5 and the third flow regulating device 7 throttle the refrigerant flow path. The first flow regulating device 4 and the fourth flow regulating device 15 are in a full-open state. The windshield valve 19 is closed. The airflow/air brought by the blower 17 does not exchange heat with the first indoor heat exchanger 2.

The working principle of the cooling mode is as follows: the refrigerant is compressed by the compressor 1 into a high-temperature and high-pressure gas state, and the refrigerant flows to the first indoor heat exchanger 2. At this time, since the windshield valve 19 is closed, the air flow/air brought by the blower 17 does not exchange heat with the first indoor heat exchanger 2, and the refrigerant temperature is almost unchanged. Then, the refrigerant flows to the outdoor heat exchanger 3, where it exchanges heat with the external environment. The refrigerant releases heat to lower its temperature, and then the refrigerant passes through the fourth flow regulating device 15, the second heat exchange portion 92 and the first flow regulating device 4 in sequence. The refrigerant is divided into two paths after passing through the first flow regulating device 4, in which one path of the refrigerant flows to the third flow regulating device 7 and the other path of the refrigerant flows to the second flow regulating device 5. Both the second flow regulating device 5 and the third flow regulating device 7 throttle the refrigerant flow path. The refrigerant changes from a gaseous state to a low-temperature and low-pressure liquid state or a gas-liquid two-phase state, and enters the second indoor heat exchanger 6 and the fourth heat exchange portion 102, respectively, for heat exchange. Among them, the refrigerant exchanges heat with the air flowing through the surface of the second indoor heat exchanger 6 in the second indoor heat exchanger 6 to absorb the heat of the air, so that the air is cooled before entering the passenger cabin. The refrigerant exchanges heat with the coolant in the third heat exchange portion 101 in the fourth heat exchange portion 102. The refrigerant absorbs the heat of the coolant, and the temperature of the coolant is lowered, so that the first heat exchange component 11 can be cooled to maintain its working temperature in an appropriate range. The two paths of the refrigerant merge in the gas-liquid separator 20, and finally flow into the compressor 1 to be compressed again, and circulate in this way.

The cooling mode of the present disclosure can also be used for dehumidification. When the air passes through the second indoor heat exchanger 6, the water vapor in the air cools and condenses into water and is discharged. It has the effect of dehumidification, that is, refrigeration and dehumidification, which can be applied to environments with high temperature and high humidity.

Figure 7:
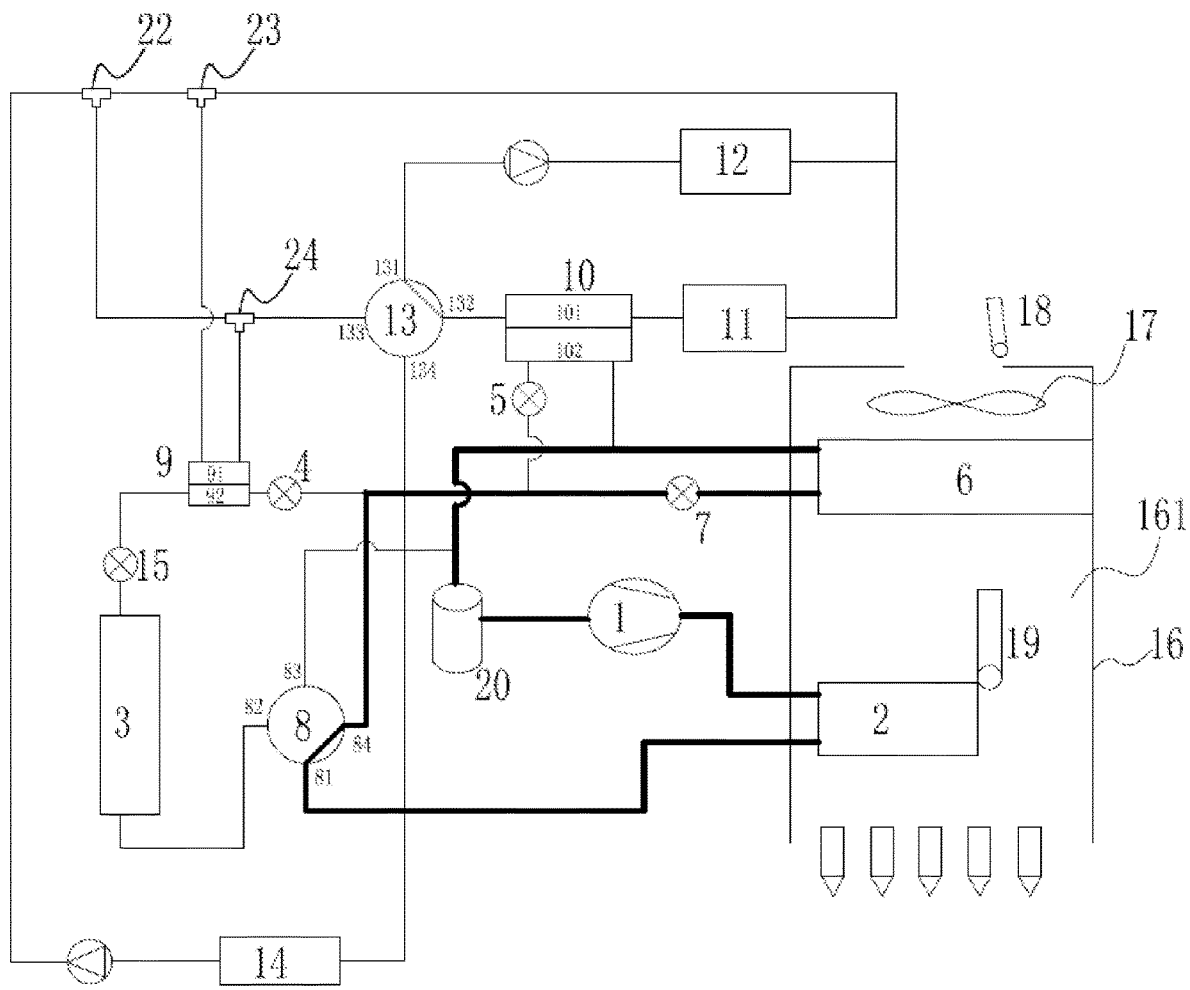
FIG. 7 is a schematic view of a working principle in a first dehumidification mode of the present disclosure.

In a low temperature environment in winter, for example, when the air conditioner is switched to inner circulation heating, more water vapor is easily generated in the passenger cabin due to the breathing of passengers, which causes fog to collect on the windshield of the car and affects the view. At this time, it is necessary to dehumidify the circulating air before discharging it into the passenger cabin, or defog the windshield. As shown in FIG. 7, the thermal management system includes a first dehumidification/defogging mode. In the first dehumidification mode, the compressor 1, the first indoor heat exchanger 2, the second fluid switching device 8, the third flow regulating device 7 and the second indoor heat exchanger 6 are in communication to form a loop. Among them, the third flow regulating device 7 throttles the refrigerant flow path. The refrigerant is compressed by the compressor 1 into a high-temperature and high-pressure gas state, and then enters the first indoor heat exchanger 2. At this time, the windshield valve 19 is opened. The refrigerant exchanges heat with the low-temperature air passing through the surface of the first indoor heat exchanger 2, the refrigerant releases heat and then decreases in temperature, and the air absorbs heat and then increases in temperature. The cooled refrigerant passes through the second fluid switching device 8 and flows to the third flow regulating device 7. The refrigerant is throttled by the third flow regulating device 7 and becomes a low-temperature and low-pressure liquid state or a gas-liquid two-phase state. Then, the refrigerant enters the second indoor heat exchanger 6 and exchanges heat with the air passing through the surface of the second indoor heat exchanger 6, and the temperature of the air is lowered. The water vapor in the air condenses into water and is discharged through the drainage structure of the air-conditioning case 16. The low-temperature air flows to the first indoor heat exchanger 2 and is heated by the first indoor heat exchanger 2 and then discharged into the passenger cabin. Therefore, the temperature of the dehumidified air will not be too low, making the environment of the passenger cabin more comfortable, and reducing the risk of fogging on the windshield and affecting the view and observing the environment outside the vehicle. In some embodiments, the first dehumidification mode may also be used in an air-conditioning outer circulation mode.

Figure 8:
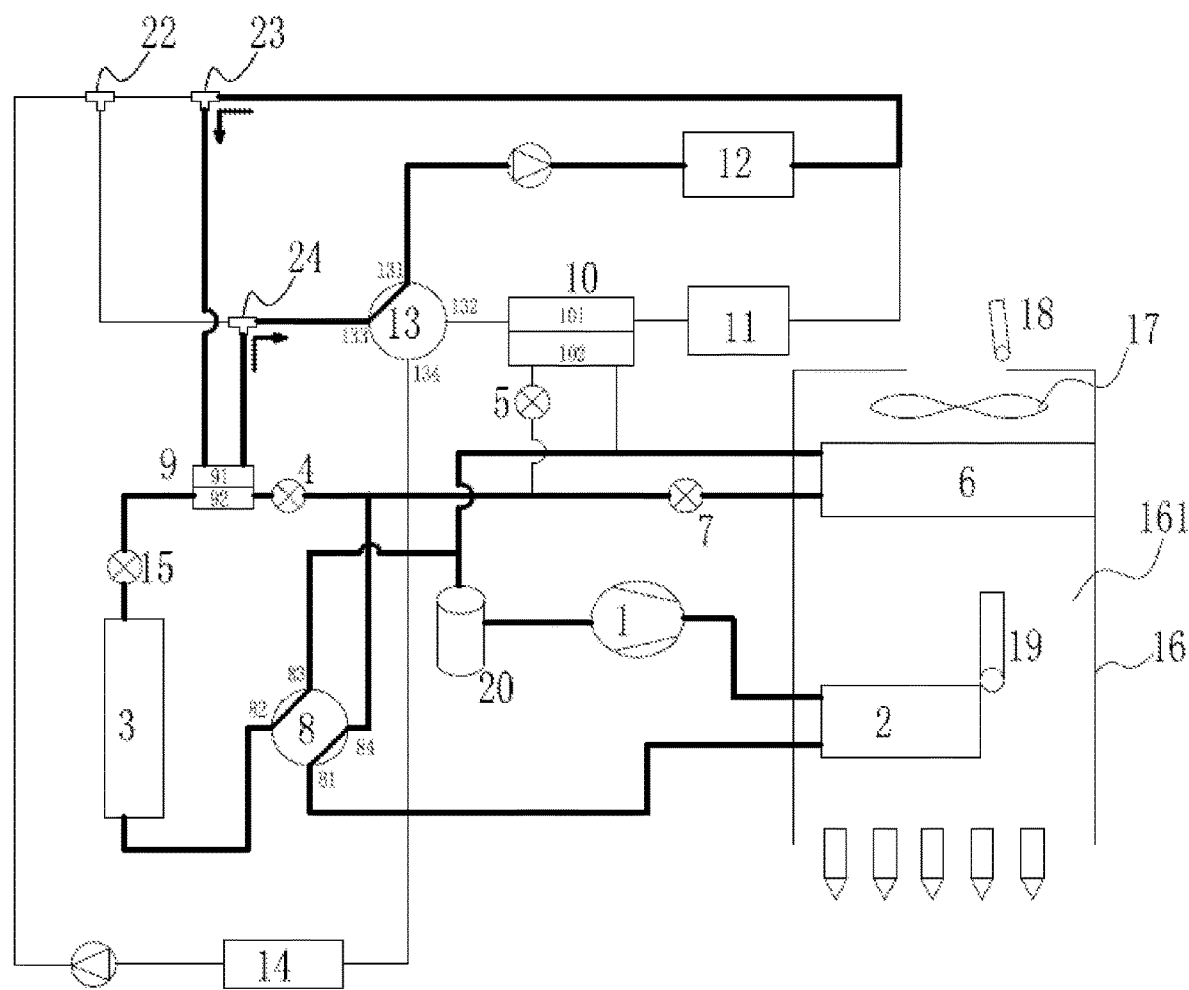
FIG. 8 is a schematic view of a working principle in a second dehumidification mode of the present disclosure.

The thermal management system further includes a second dehumidification/defogging mode to meet high heating requirements. As shown in FIG. 8, in the second dehumidification mode, the first port 131 is in communication with the third port 133, the fifth port 81 is in communication with the eighth port 84, the sixth port 82 is in communication with the seventh port 83, and the compressor 1, the first indoor heat exchanger 2, the second fluid switching device 8, the third flow regulating device 7, the second indoor heat exchanger 6 and the gas-liquid separator 20 are in communication to form a loop. At the same time, the compressor 1, the first indoor heat exchanger 2, the second fluid switching device 8, the first flow regulating device 4, the second heat exchange portion 92, the fourth flow regulating device 15, the outdoor heat exchanger 3 and the gas-liquid separator 20 are in communication to form a loop. And, the heater 12, the first heat exchange portion 91 and the first fluid switching device 13 are in communication to form a loop. Among them, the heater 12 is turned on to heat the coolant, and the first flow regulating device 4 and the third flow regulating device 7 throttle the refrigerant flow path. Different from the first dehumidification mode, the refrigerant is divided into two paths after passing through the second fluid switching device 8. One path of the refrigerant flows to the third flow regulating device 7. The working principle of this refrigerant flow path is the same as the working principle of the first dehumidification mode, and will not be described in detail here. The other path of the refrigerant flows to the first flow regulating device 4. After being throttled by the first flow regulating device 4, the other path of the refrigerant becomes a low temperature and low pressure liquid state or a gas-liquid two-phase state. Then, the refrigerant flows into the second heat exchange portion 92 and exchanges heat with the coolant in the first heat exchange portion 91. The temperature of the refrigerant absorbing the coolant flows out of the second heat exchange portion 92, and enters the outdoor heat exchanger 3 after passing through the fourth flow regulating device 15. At this time, the fourth flow regulating device 15 is in the full-open state. After the refrigerant enters the outdoor heat exchanger 3, it can continue to absorb heat from the outdoor environment. After absorbing the heat of the outdoor environment, it merges with another refrigerant and flows to the gas-liquid separator 20, and finally flows back into the compressor 1 to be compressed again, and circulates in this way. It should be noted that when the temperature at which the heater 12 heats the coolant is limited, the refrigerant does not absorb enough heat in the second heat exchange portion 92, it can continue to absorb heat in the outdoor heat exchanger 3.

In some embodiments, in the second dehumidification mode, the fourth flow regulating device 15 may also be in a throttling state. The refrigerant is throttled, cooled down and depressurized before entering the outdoor heat exchanger 3, thereby absorbing more heat in the outdoor heat exchanger 3. In other embodiments, in the second dehumidification mode, the heater may also be turned off. At this time, the first flow regulating device 4 is in a full-open state without throttling. The refrigerant does not exchange heat in the second heat exchange portion 92. The fourth flow regulating device 15 is in a throttling state, and the refrigerant is cooled down and depressurized after passing through the fourth flow regulating device 15 so as to become a liquid state or a gas-liquid two-phase state. Then, the refrigerant enters the outdoor heat exchanger 3, exchanges heat with the outdoor environment, and absorbs heat. In other embodiments, in the second dehumidification mode, the third port 133 is in communication with the fourth port 134. Referring to the coolant loop where the second heat exchange component 14 is shown in FIG. 3, the excess heat generated by the second heat exchange component 14 can be transferred to the refrigerant flow path through the first heat exchanger 9. At this time, the first flow control device 4 throttles the refrigerant flow path so that the low-temperature refrigerant absorbs the heat of the coolant of the first heat exchange portion 91 in the second heat exchange portion 92.

Figure 9:
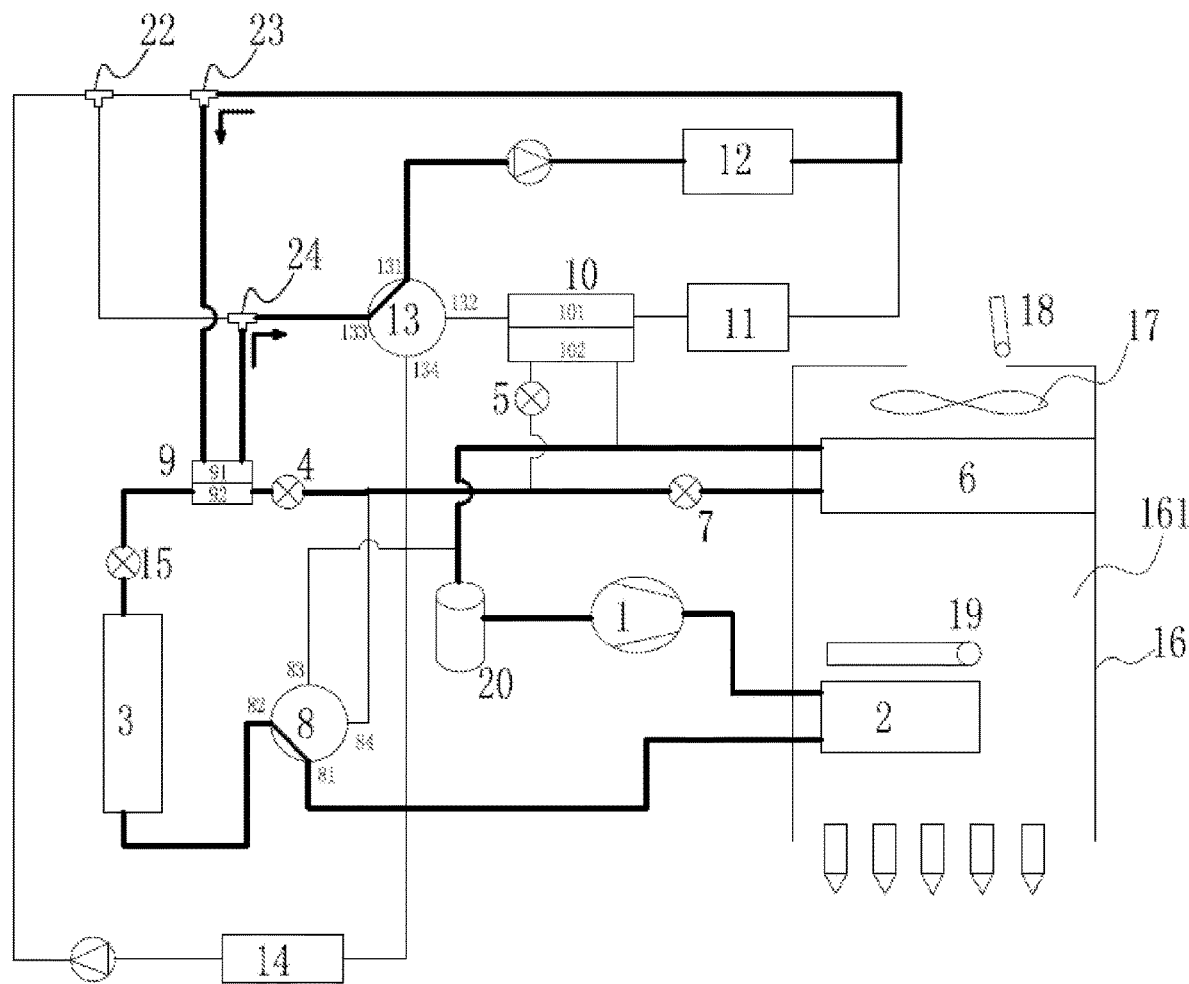
FIG. 9 is a schematic view of a working principle in a first defrosting mode of the present disclosure.

When the ambient temperature is low in winter, after the heating time of the system is long, the outdoor heat exchanger 3 is prone to frost, and the outdoor heat exchanger 3 needs to be defrosted so as to restore the heat exchange capacity. The thermal management system includes a first defrosting mode. As shown in FIG. 9, in the first defrosting mode, the fifth port 81 is in communication with the sixth port 82, and the compressor 1, the first indoor heat exchanger 2, the outdoor heat exchanger 3, the fourth flow regulating device 15, the second heat exchange portion 92, the first flow regulating device 4, the second indoor heat exchanger 6 and the gas-liquid separator 20 are in communication to form a loop. Among which, the fourth flow regulating device 15 throttles the refrigerant flow path. The first flow regulating device 4 is in a full-open state. The refrigerant enters the outdoor heat exchanger 3 firstly, and then flows through the fourth flow regulating device 15 into the second heat exchange portion 92. The refrigerant absorbs the heat of the coolant through the first heat exchanger 9. And, the first port 131 is in communication with the third port 133. The heater 12, the first heat exchange component 11 and the first fluid switching device 13 are in communication to form a loop, in which the heater 12 is turned on.

The refrigerant is compressed by the compressor 1 into a high-temperature and high-pressure gas state, and flows into the first indoor heat exchanger 2. In the first defrosting mode, the windshield valve 19 is closed to block the heat exchange between the air and the first indoor heat exchanger 2, so that the refrigerant temperature is almost unchanged. The high-temperature refrigerant enters the outdoor heat exchanger 3 and releases heat to the surrounding environment of the outdoor heat exchanger 3, so that the frost on the surface of the outdoor heat exchanger 3 is melted and the purpose of defrosting is achieved. When the low-temperature refrigerant passing through the outdoor heat exchanger 3 flows through the fourth flow regulating device 15, it changes into a liquid state or a gas-liquid two-phase state after cooling and depressurizing, and then flows to the second heat exchange portion 92. The low-temperature refrigerant exchanges heat with the coolant of the first heat exchange portion 91 in the second heat exchange portion 92. The refrigerant absorbs the heat of the coolant. The refrigerant flows out of the second heat exchange portion 92 and flows through the first flow regulating device 4. At this time, the first flow regulating device 4 is in the full-open state, and the refrigerant state does not change. Before the refrigerant enters the second indoor heat exchanger 6 again, it is throttled and depressurized by the third flow regulating device 7 and the temperature is lowered again, so that more heat can be absorbed from the air in the second indoor heat exchanger 6. Finally, the refrigerant flows to the gas-liquid separator 20, and after the gas-liquid separation, it returns to the compressor 1 to be compressed again, and circulates in this way. The coolant is heated by the heater 12. In the first defrosting mode, the first heat exchanger 9 is used as an evaporator, and the outdoor heat exchanger 3 is used as a condenser. When the refrigerant has absorbed enough heat in the second heat exchange portion 92, the third flow regulating device 7 may be in a full-open state. The refrigerant does not exchange heat in the second indoor heat exchanger 6, and the air will not be cooled. At this time, the air inlet valve 18 can also be closed, so that no cold air can enter the passenger cabin. In some embodiments, after the refrigerant passes through the second heat exchange portion 92, it may not pass through the second indoor heat exchanger 6 but directly return to the gas-liquid separator 20 or the compressor 1. In other embodiments, the third port 133 is in communication with the fourth port 134, and the refrigerant flow path remains unchanged. Referring to the coolant loop where the second heat exchange component 14 is located as shown in FIG. 3, the excess heat generated by the second heat exchange component 14 can be transferred to the refrigerant flow path through the first heat exchanger 9, so that the low-temperature refrigerant can absorb the heat of the coolant of the first heat exchange portion 91 in the second heat exchange portion 92. As a result, the excess heat generated by the second heat exchange component 14 can be used for defrosting.

Figure 10:
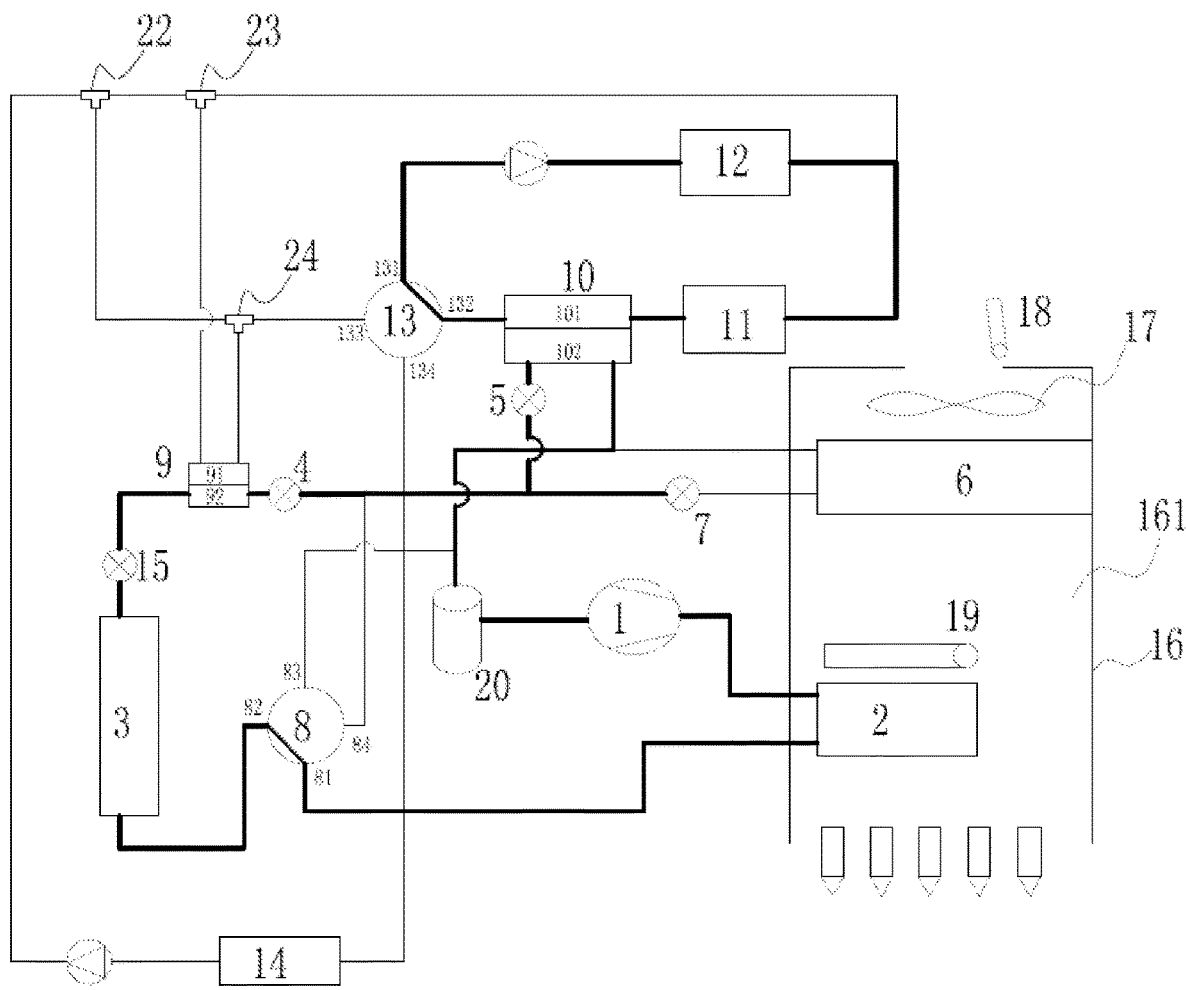
FIG. 10 is a schematic view of a working principle in a second defrosting mode of the present disclosure.

The thermal management system further includes a second defrosting mode. As shown in FIG. 10, in the second defrosting mode, the compressor 1, the first indoor heat exchanger 2, the second fluid switching device 8, the outdoor heat exchanger 3, the fourth flow regulating device 15, the second heat exchange portion 92, the first flow regulating device 4, the second flow regulating device 5 and the fourth heat exchange portion 102 are in communication to form a loop. Among which, the first flow regulating device 4 and the fourth flow regulating device 15 are in a full-open state. The third flow regulating device 7 is closed. The refrigerant does not pass through the second indoor heat exchanger 6. The second flow regulating device 5 throttles the refrigerant flow path. The low-temperature refrigerant flows into the fourth heat exchange portion 102 to exchange heat with the coolant in the third heat exchange portion 101. At the same time, the first heat exchange component 11, the heater 12 and the third heat exchange portion 101 are in communication to form a loop. The coolant absorbs the excess heat generated by the first heat exchange component 11 and then rises up, and transfers the heat to the refrigerant flow path through the second heat exchanger 10. When the first heat exchange component 11 cannot generate excess heat, the heater 12 can be turned on for heating and supplementing heat. In other embodiments, the second defrosting mode and the first defrosting mode may be combined with each other. For example, the first port 131 is in communication with the second port 132, and the third port 133 is in communication with the fourth port 134. The excess heat generated by the first heat exchange component 11 and the second heat exchange component 14 can be transferred to the refrigerant flow path through the first heat exchanger 9 and the second heat exchanger 10, respectively. The first heat exchanger 9 and the second heat exchanger 10 are used as evaporators. The refrigerant may not pass through the second indoor heat exchanger 6.

Figure 11:
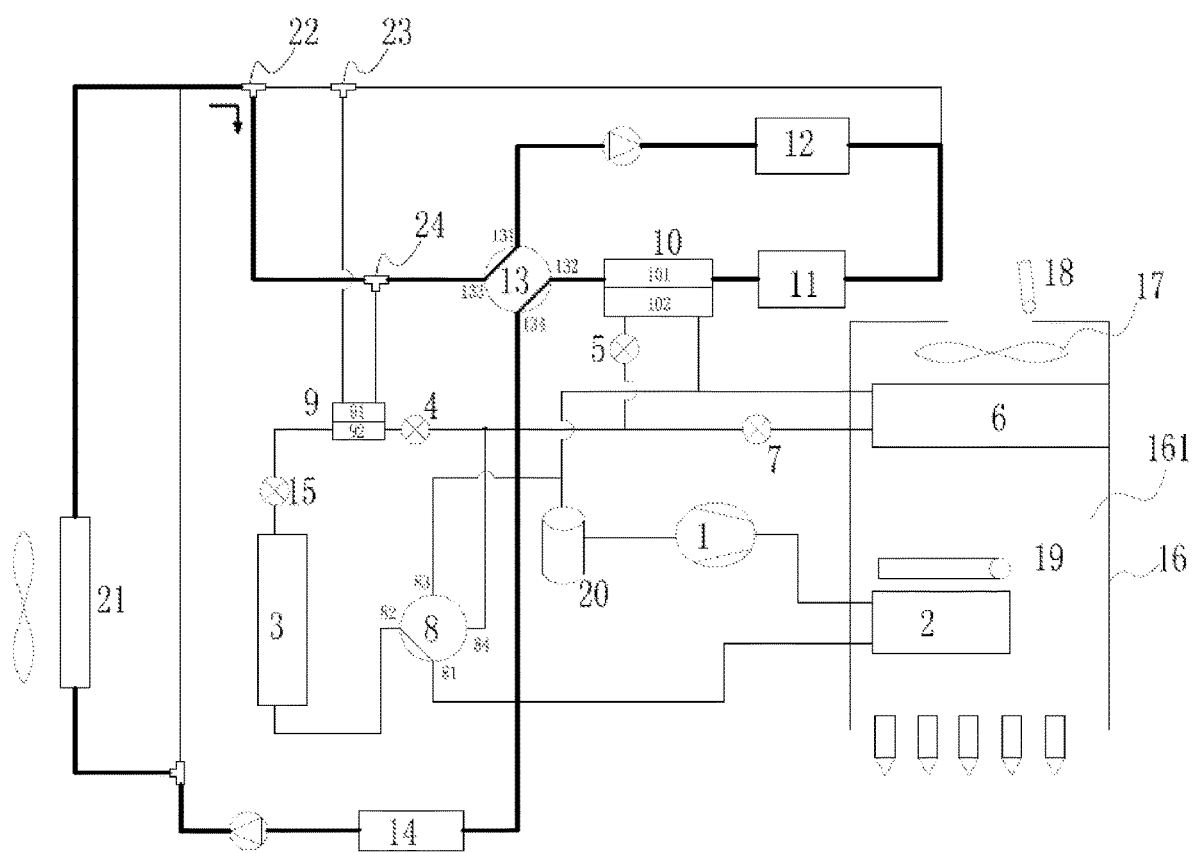
FIG. 11 is a schematic view of a working principle in a battery fast charging mode of the present disclosure.

The first heat exchange component 11 includes a battery. When the battery is charged quickly, heat is generated, and the accumulation of heat can cause safety hazards. The thermal management system includes a battery fast charging and cooling mode and a third heat exchanger 21. The third heat exchanger 21 may be a heat dissipation water tank or an air heat exchanger. As shown in FIG. 11, in the battery fast charging and cooling mode, the first port 131 is in communication with the second port 132, the third port 133 is in communication with the fourth port 134, and the second heat exchanger 10, the first heat exchange component 11, the heater 12, the first fluid switching device 13, the second heat exchange component 14 and the third heat exchanger 21 are in communication to form a loop. The coolant absorbs the heat of the battery to heat up, and the battery cools down. The coolant enters the third heat exchanger 21 and exchanges heat with the air, so as to achieve the purpose of battery heat dissipation.

Figure 12:
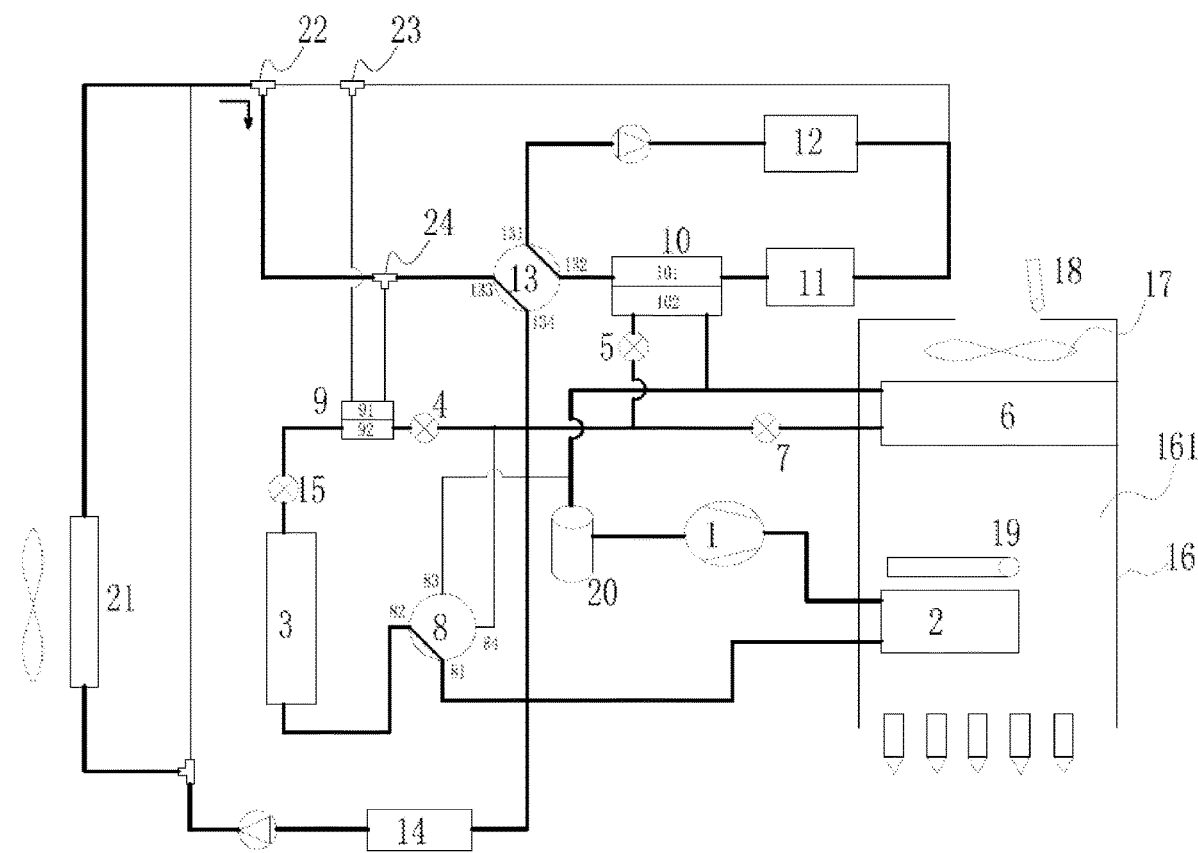
FIG. 12 is a schematic view of the working principle in the cooling mode of another embodiment of the present disclosure.

The third heat exchanger 21 can also be used for heat dissipation of the second heat exchange component 14. For example, in the cooling mode, the excess heat generated by the second heat exchange component 14 does not need to be recovered, and the second heat exchange component 14 needs to dissipate heat (for example, the motor needs heat dissipation). As shown in FIG. 12, the third port 133 is in communication with the fourth port 134. The second heat exchange component 14 and the third heat exchanger 21 are in communication to form a loop. The coolant absorbs the heat of the second heat exchange component 14 and then rises up. The high-temperature coolant enters the third heat exchanger 21 and exchanges heat with the air, so as to achieve the purpose of dissipating heat for the second heat exchange component 14.

The above descriptions are only preferred embodiments of the present disclosure, and do not limit the present disclosure in any form. Although the preferred embodiments of the present disclosure have been disclosed as above, they are not intended to limit the present disclosure. Any of ordinary skill in the art, without departing from the scope of the technical solutions disclosed in the present disclosure, can use the technical content disclosed above to make some changes or modifications into equivalent embodiments with equivalent changes. However, without departing from the content of the technical solutions of the present disclosure, any simple modifications, equivalent changes and amendments made to the above embodiments based on the technical essence of the present disclosure still fall within the scope of the technical solutions of the present disclosure.

What is claimed is:

1. A thermal management system, comprising: a refrigerant flow path, a coolant flow path, a first heat exchanger and a second heat exchanger; the refrigerant flow path comprising a compressor, a first indoor heat exchanger, the first flow regulating device and a second flow regulating device; the coolant flow path comprising a first heat exchange component and a heater;

wherein the first heat exchanger comprises a first heat exchange portion and a second heat exchange portion, the first heat exchange portion is connected to the coolant flow path, the second heat exchange portion is connected to the refrigerant flow path; the second heat exchanger comprises a third heat exchange portion and a fourth heat exchange portion, the third heat exchange portion is connected to the coolant flow path, and the fourth heat exchange portion is connected to the refrigerant flow path;

wherein the thermal management system comprises a first heating mode and a second heating mode;

in the first heating mode, the compressor, the first indoor heat exchanger, the second flow regulating device and the fourth heat exchange portion are in communication; and, the first heat exchange component, the heater and the third heat exchange portion are in communication; wherein, when the heater is turned on, the heater heats a coolant, and the coolant absorbs heat from the first heat exchange component; or the heater is turned off, and the coolant absorbs heat of the first heat exchange component; the second flow regulating device throttles the refrigerant flow path, and a refrigerant in the fourth heat exchange portion absorbs heat of the coolant in the third heat exchange portion;

in the second heating mode, the compressor, the first indoor heat exchanger, the first flow regulating device and the second heat exchange portion are in communication; and, the first heat exchange portion and the heater are in communication; wherein the heater is turned on to heat the coolant, the first flow regulating device throttles the refrigerant flow path, and the refrigerant in the second heat exchange portion absorbs heat of the coolant in the first heat exchange portion.

2. The thermal management system according to claim 1, wherein the coolant flow path further comprises a second heat exchange component and a first fluid switching device, the first fluid switching device comprises a first port, a second port, a third port and a fourth port, the first port is in communication with the heater, the second port is in communication with the first heat exchange component, the third port is in communication with the first heat exchange portion, and the fourth port is in communication with the second heat exchange component; and wherein in the first heating mode, the first port is in communication with the second port, the third port is in communication with the fourth port, and the second heat exchange component, the first heat exchange portion and the first fluid switching device are in communication; and wherein in the second heating mode, the first port is in communication with the third port.

3. The thermal management system according to claim 2, further comprising a battery preheating working mode; wherein in the battery preheating working mode, the first port is in communication with the second port, and the first heat exchange component, the heater and the first fluid switching device are in communication; and wherein the heater is turned on to heat the coolant.

4. The thermal management system according to claim 2, wherein the refrigerant flow path further comprises an outdoor heat exchanger, a second indoor heat exchanger and a third flow regulating device; the thermal management system further comprises a cooling mode, in the cooling mode, the first port is in communication with the second port, the compressor, the first indoor heat exchanger, the outdoor heat exchanger, the second heat exchange portion, the first flow regulating device, the third flow regulating device and the second indoor heat exchanger are in communication; meanwhile, the compressor, the first indoor heat exchanger, the outdoor heat exchanger, the first flow regulating device, the second heat exchange portion, the second flow regulating device and the fourth heat exchange portion are in communication; and the heater, the first heat exchange component, the third heat exchange portion and the first fluid switching device are in communication; and wherein the second flow regulating device and the third flow regulating device throttle the refrigerant flow path, the first flow regulating device is in a full-open state, the first indoor heat exchanger is an air-cooled heat exchanger, and the refrigerant in the first indoor heat exchanger does not exchange heat with air.

5. The thermal management system according to claim 4, further comprising a windshield valve disposed upstream of the first indoor heat exchanger; wherein in the cooling mode, the windshield valve is in a closed state to block the air from flowing to the first indoor heat exchanger.

6. The thermal management system according to claim 4, further comprising a first dehumidification mode; wherein in the first dehumidification mode, the compressor, the first indoor heat exchanger, the third flow regulating device and the second indoor heat exchanger are in communication; and wherein the third flow regulating device throttles the refrigerant flow path.

7. The thermal management system according to claim 4, further comprising a second dehumidification mode; wherein in the second dehumidification mode, the first port is in communication with the third port; the compressor, the first indoor heat exchanger, the third flow regulating device and the second indoor heat exchanger are in communication; meanwhile, the compressor, the first indoor heat exchanger, the first flow regulating device, the second heat exchange portion and the outdoor heat exchanger are in communication; and the heater, the first heat exchange portion and the first fluid switching device are in communication; and wherein the heater is turned on to heat the coolant, and the first flow regulating device and the third flow regulating device throttle the refrigerant flow path.

8. The thermal management system according to claim 4, wherein the refrigerant flow path further comprises a fourth flow regulating device; in the first heating mode and the second heating mode, the compressor, the first indoor heat exchanger, the first flow regulating device, the second heat exchange portion, the fourth flow regulating device and the outdoor heat exchanger are in communication, and the fourth flow regulating device throttles the refrigerant flow path; the refrigerant firstly enters the second heat exchange portion through the first flow regulating device, and then flows through the fourth flow regulating device into the outdoor heat exchanger; or, the refrigerant firstly enters the outdoor heat exchanger through the fourth flow regulating device, and then flows through the first flow regulating device into the second heat exchange portion.

9. The thermal management system according to claim 8, further comprising a first defrosting mode; wherein in the first defrosting mode, the compressor, the first indoor heat exchanger, the outdoor heat exchanger, the fourth flow regulating device, the second heat exchange portion and the first flow regulating device are in communication; wherein the fourth flow regulating device throttles the refrigerant flow path, the first flow regulating device is in a full-open state, and the refrigerant firstly enters the outdoor heat exchanger, and then flows into the second heat exchange portion through the fourth flow regulating device, and the refrigerant absorbs the heat of the coolant through the first heat exchanger; and the first port is in communication with the third port; the heater, the first fluid switching device and the first heat exchange portion are in communication; and wherein the heater is turned on to heat the coolant.

10. The thermal management system according to claim 9, wherein in the first defrosting mode, the compressor, the first indoor heat exchanger, the outdoor heat exchanger, the fourth flow regulating device, the second heat exchange portion, the first flow regulating device, the third flow regulating device and the second indoor heat exchanger are in communication; and wherein the third flow regulating device throttles the refrigerant flow path, and the refrigerant flowing out of the first flow regulating device flows through the third flow regulating device and then enters the second indoor heat exchanger.

11. The thermal management system according to claim 8, further comprising a second defrosting mode, wherein in the second defrosting mode, the compressor, the first indoor heat exchanger, the outdoor heat exchanger, the fourth flow regulating device, the second heat exchange portion, the first flow regulating device, the second flow regulating device and the fourth heat exchange portion are in communication; and wherein the first flow regulating device and the fourth flow regulating device are in a full-open state, the second flow regulating device throttles the refrigerant flow path, the refrigerant absorbs the heat of the coolant through the second heat exchanger, the first port is in communication with the second port, and the heater, the first fluid switching device, the third heat exchange portion and the first heat exchange component are in communication; and wherein the heater is turned on to heat the coolant.

12. The thermal management system according to claim 1, wherein the refrigerant flow path further comprises a second fluid switching device, the second fluid switching device comprises a fifth port, a sixth port, a seventh port and an eighth port, an outlet of the first indoor heat exchanger is in communication with the fifth port, and an inlet of the compressor is in communication with the seventh port;
wherein a second port of the outdoor heat exchanger is in communication with the sixth port, a first port of the outdoor heat exchanger is in communication with a second port of the second heat exchange portion, and a first port of the second heat exchange portion is in communication with the eighth port; and
wherein in the first heating mode and the second heating mode, the fifth port is in communication with the eighth port, and the sixth port is in communication with the seventh port.

13. The thermal management system according to claim 2, further comprising a battery fast charging and cooling mode and a third heat exchanger; wherein in the battery fast charging and cooling mode, the first port is in communication with the second port, and the third port is in communication with the fourth port; and wherein in the battery fast charging and cooling mode, the third heat exchange portion, the first heat exchange component, the heater, the first fluid switching device, the second heat exchange component and the third heat exchanger are in communication, and the coolant in the third heat exchanger is capable of exchanging heat with air.

14. The thermal management system according to claim 4, further comprising a third heat exchanger; wherein in the cooling mode, the third port is in communication with the fourth port, the second heat exchange component, the third heat exchanger and the first fluid switching device are in communication, and the coolant in the third heat exchanger is capable of exchanging heat with air.

15. The thermal management system according to claim 13, wherein the third heat exchanger is an air-cooled heat exchanger.

16. The thermal management system according to claim 4, further comprising a blower and an air-conditioning case, the air-conditioning case having an air duct, all of the first indoor heat exchanger, the second indoor heat exchanger and the blower being disposed in the air duct; wherein the blower is located upstream of the second indoor heat exchanger, and the second indoor heat exchanger is located upstream of the first indoor heat exchanger.

17. A thermal management system, comprising: a compressor, a first indoor heat exchanger, an outdoor heat exchanger, a first flow regulating device, a second flow regulating device, a first heat exchange component, a heater, a first heat exchanger, a second heat exchanger and a driving device;
wherein the first heat exchanger and the second heat exchanger are both dual-channel heat exchangers, the first heat exchanger comprises a first heat exchange portion and a second heat exchange portion, and the second heat exchanger comprises a third heat exchange portion and a fourth heat exchange portion; and wherein the thermal management system comprises a first heating mode and a second heating mode;

in the first heating mode, the compressor, the first indoor heat exchanger, the second flow regulating device and the fourth heat exchange portion are in communication; the driving device, the first heat exchange component, the heater and the third heat exchange portion are in communication; the second flow regulating device throttles a refrigerant, and the refrigerant in the fourth heat exchange portion absorbs heat of a coolant in the third heat exchange portion; and in the second heating mode, the compressor, the first indoor heat exchanger, the first flow regulating device, the second heat exchange portion and the outdoor heat exchanger are in communication; the driving device, the first heat exchange portion and the heater are in communication; the heater is turned on to heat the coolant, the first flow regulating device throttles the refrigerant, and the refrigerant in the second heat exchange portion absorbs heat of the coolant in the first heat exchange portion.

18. The thermal management system according to claim 17, further comprising a second heat exchange component, a first fluid switching device and a second fluid switching device, the first fluid switching device comprising a first port, a second port, a third port and a fourth port, the first port being in communication with the heater, the second port being in communication with the first heat exchange component, the third port being in communication with the first heat exchange portion, the fourth port being in communication with the second heat exchange component;

the second fluid switching device comprising a fifth port, a sixth port, a seventh port and an eighth port, an outlet of the first indoor heat exchanger being in communication with the fifth port, an inlet of the compressor being in communication with the seventh port, a second port of the outdoor heat exchanger being in communication with the sixth port, a first port of the outdoor heat exchanger being in communication with a second port of the second heat exchange portion, a first port of the second heat exchange portion being in communication with the eighth port;

wherein the first fluid switching device and the second fluid switching device are both four-way valves, the first fluid switching device is capable of realizing serial or parallel connection of the first heat exchange component and the second heat exchange component, and the second fluid switching device is capable of switching a flow direction of the refrigerant.

19. The thermal management system according to claim 17, wherein the driving device comprises a first pump and a second pump, the first pump is capable of communicating with the first heat exchange component, and the second pump is capable of communicating with the second heat exchange component;

wherein the thermal management system further comprises a third heat exchanger, a second indoor heat exchanger and an air-conditioning case, the third heat exchanger is capable of communicating with at least one of the first heat exchange component and the second heat exchange component, the third heat exchanger and the outdoor heat exchanger are located outside the air-conditioning case, the first indoor heat exchanger and the second indoor heat exchanger are located in the air-conditioning case, the first indoor heat exchanger is communicated between the compressor and the second fluid switching device, and the third heat exchanger is in communication with the second pump.

20. A thermal management system, comprising:

a refrigerant subsystem including a compressor, a first indoor heat exchanger, a regulating device, and an outdoor heat exchanger;

a coolant subsystem including a pump, a heater and a heat exchange component, the heat exchange component being used to exchange heat with at least one of a battery, a motor, an inverter and a controller of a vehicle; and a first dual-channel heat exchanger having a first refrigerant channel and a first coolant channel, the first refrigerant channel being a part of the refrigerant subsystem, the first coolant channel being a part of the coolant subsystem;

a second dual-channel heat exchanger having a second refrigerant channel and a second coolant channel, the second refrigerant channel being a part of the refrigerant subsystem, the second coolant channel being a part of the coolant subsystem;

wherein said thermal management system comprises a first heating mode and a second heating mode, under the first heating mode and the second heating mode, the refrigerant subsystem and the coolant subsystem are operated;

the refrigerant subsystem being configured for flowing a refrigerant; and the coolant subsystem being configured for flowing a coolant;

wherein in the first heating mode, the compressor, the first indoor heat exchanger, the flow regulating device and the second refrigerant channel are in communication; and, the heat exchange component, the heater and the second coolant channel are in communication; wherein, when the heater is turned on, the heater heats the coolant, and the coolant absorbs heat from the heat exchange component; or the heater is turned off, and the coolant absorbs heat of the heat exchange component; the refrigerant in the second refrigerant channel absorbs heat of the coolant in the second coolant channel; and wherein in the second heating mode, the compressor, the indoor heat exchanger, the flow regulating device, the first refrigerant channel and the outdoor heat exchanger are in communication; and, the first coolant channel and the heater are in communication; wherein the heater is turned on to heat the coolant, the refrigerant in the first refrigerant channel absorbs heat of the coolant in the first coolant channel.

* * * * *